Figure 1:
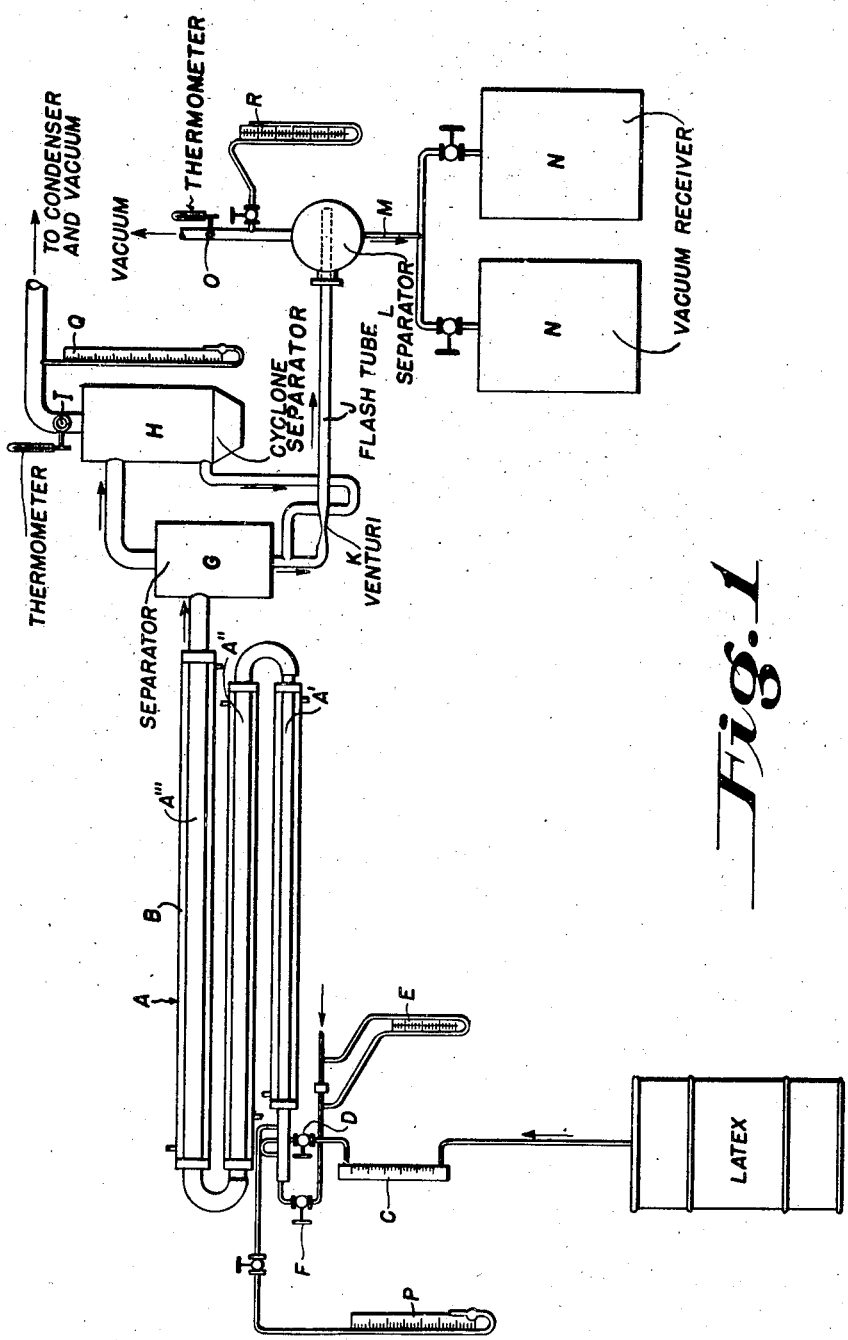

INVENTORS
RAYMOND W. MORROW
& JAMES L. PARSONS
BY
Cullen G. Frey
ATTORNEY

INVENTORS
RAYMOND W. MORROW
& JAMES L. PARSONS
BY
ATTORNEY

Patented Apr. 19, 1949

2,467,769

UNITED STATES PATENT OFFICE 2,467,769

REMOVAL OF VOLATILE SUBSTANCES FROM AQUEOUS DISPERSIONS OF ELASTOMERIC MATERIALS

Raymond W. Morrow, Wilmington, Del., and James L. Parsons, Carneys Point, N. J., assignors to E. I. du Pont de Nemours & Company, Wilmington, Del., a corporation of Delaware Application June 22, 1946, Serial No. 678,698

4 Claims. (Cl. 202—47)

This invention relates to the removal of volatile substances from aqueous dispersions of elastomeric materials. The invention relates more particularly to the concentration of elastomer latices, the deodorization of the same by the removal of undesirable volatile constituents, and the recovery of volatile materials for re-use in the preparation of elastomers.

The term "elastomers" is used in this specification in the now generally accepted sense more particularly defined by Fisher in Ind. & Eng. Chem., vol. 31, No. 8, August 1939, pages 941–945, and includes natural rubber and the synthetic polymers which have rubber-like properties. The term "elastomer latices" is used to refer to the latex of natural rubber or to the corresponding aqueous dispersions of the synthetic polymers which are, of course, artificially produced by the methods now well recognized by those skilled in this art.

In general, this invention deals with the removal of volatile substances from aqueous dispersions of elastomeric materials by a combination of "turbannular flow evaporation" and flash distillation. The expression "turbannular flow evaporation" will hereinafter refer to a method of evaporation in which a mixture, containing a very large ratio by volume of vapor to the liquid to be stripped or evaporated, is injected into externally heated tubes through which the mixture of vapor and liquid (including any dispersed solid) moves at very high velocities whereby the liquid (and any dispersed solids which it may contain) is forced to flow along the inner walls of the tubes so that boiling occurs on the walls of the tubes and the liquid is thus concentrated and/or stripped by the removal of volatile materials.

Water dispersions of finely divided particles of synthetic elastomers, as commonly prepared by polymerization, contain volatile constituents which it is desirable to remove because they impart odor to the latex and may other wise impair the properties of the latex or products produced therefrom. The latices, as produced, usually contain small amounts of unpolymerized monomers which could be used in subsequent polymerizations if a suitable method of recovering them from the latex could be devised. In addition to removing these volatile materials, it is often necessary to remove a portion of the water to increase the solids content. For example, it is usually necessary to concentrate the normal 50% solids neoprene latex to 60% to make it suitable for use in froth sponge manufacture.

The most direct method of deodorizing and concentrating latex would be to distill the latex, preferably under reduced pressure, but, due to the character of the dispersion, an excessive amount of foam produced in a normal kettle, or batch distillation, has made such a process extremely slow or impossible. The surface active agents present in the natural or synthetic latex produce a small bubble size, stable foam that normally fills the distillation vessel and lines and carries with it large amounts of the latex. Such boiling processes are unsatisfactory for large scale commercial production, either through inability to keep the strong foaming within harmless dimensions, or on account of coagulation to which the latex films forming the foam bubbles are liable when water is extracted from them by evaporation.

The cause for the polymer coagulation on the heated surfaces during distillation is the slower renewal of the liquid film at the heated surface with increasing viscosity of the latex. This causes over-concentration and coagulation of the polymer on the walls, with resulting decrease in efficiency of heat transfer.

It has been possible to reduce foaming in latex to some extent by the use of various antifoaming agents, but this use is often accompanied by some impairment of properties of the latex. Even with the use of the antiforming agents, the batch evaporation in kettles is limited to a moderate rate due to the tendency of the latex to coagulate in a film on the heating surface because of poor circulation of the latex.

Large economies could be effected if a boiling process could be devised which would prevent foam formation and coagulation and thus permit the stripping and recovery of the unpolymerized monomers from various latices, such, for example, as the removal of chloroprene from the polymerized emulsions produced in making dry neoprene; acrylonitrile and chloroprene from the latex in the process for making interpolymers of acrylonitrile-neoprene; and butadiene and styrene from GR–S emulsions.

It is an object of this invention to provide an improved process for effecting evaporation of volatile constituents of elastomer latices which may be used in the concentration of the latex, the removal of undesirable volatile materials which may be present therein, or the recovery of volatile monomeric material which may be re-used in the preparation of elastomers. A further object of the invention is to provide a process for boiling elastomer latices under conditions whereby coagulation on the heated surface is prevented. A still further object is to provide a process which will materially raise the liquid film heat transfer coefficient of the elastomer latices to increase the overall heat transfer from the heating medium to the latex. Another object of the invention is to provide a process for evaporating elastomer latices which has no extended period of preheating before the boiling commences, which involves only a short heating period, which does not require the addition of antifoaming agents during the heating operation, and which in the same operation discharges the concentrated product in a cooled condition.

Further objects and advantages of the invention will be apparent from the following description.

We have found that, where steam and the elastomer latex are introduced simultaneously into an externally heated tube at relatively high velocities so that the latex is forced to flow along the inner annular walls of the tube under turbannular flow, boiling occurs on the walls of the tube without coagulation of the latex or the formation of a coagulated film on the heated surface. Where the partially evaporated and heated latex is then immediately passed through a flash concentrator, such as through a constriction in a tube, without the further addition of heat, and the resulting vapors are continually withdrawn from the system, the latex is concentrated to a material degree without coagulation or any detrimental effect. By the same operation, the latex is brought to a desired low temperature for storage. Undesirable volatile materials may thereby be readily eliminated from the latex and any desirable volatile fraction originally present in the latex may be recovered by suitable condensers and fractionation.

The process is preferably carried out under partial vacuum so that lower temperatures may be employed than those ordinarily used for the boiling of the latex. Higher temperatures and superatmospheric pressures may be employed when found desirable, as long as the differences in pressures employed provide sufficient velocity for flow of the steam and the latex through the system.

An important feature of this process, when used for the deodorization and concentration of aqueous dispersions of synthetic elastomers, is the use of vapor velocities of not less than 125 to 150 ft./sec. The necessity for this minimum vapor velocity is two-fold: to prevent coagulation or polymer formation in the steam-jacketed boiler tubes with resultant decrease in efficiency of operation, and to prevent undesirable foaming of the latex causing entrainment and loss of latex through the condensing systems.

The present invention is particularly applicable to the concentration and stripping of polychloroprene latices which are normally produced in a concentration of not over 50% solids content and which it is desirable to concentrate to about 60%. In the manufacture of these latices, certain volatile materials are present which impart an undesirable odor and which can be expelled by boiling the solution. There is also present in the latex, under the preferred methods of manufacture, some unpolymerized chloroprene which we have found can be stripped from the latex and recovered for re-use. In the present description, the term "neoprene" is used to refer to the synthetic elastomers produced by the polymerization of chloroprene. While the following detailed description of the invention is based on the distillation or evaporation of latex, it is to be understood that this process is used merely to exemplify the invention, and that the present invention is applicable not only to polychloroprene latices, but to the distillation of any elastomer latex which it is necessary or desirable to subject to distillation or concentration.

Figure 2:
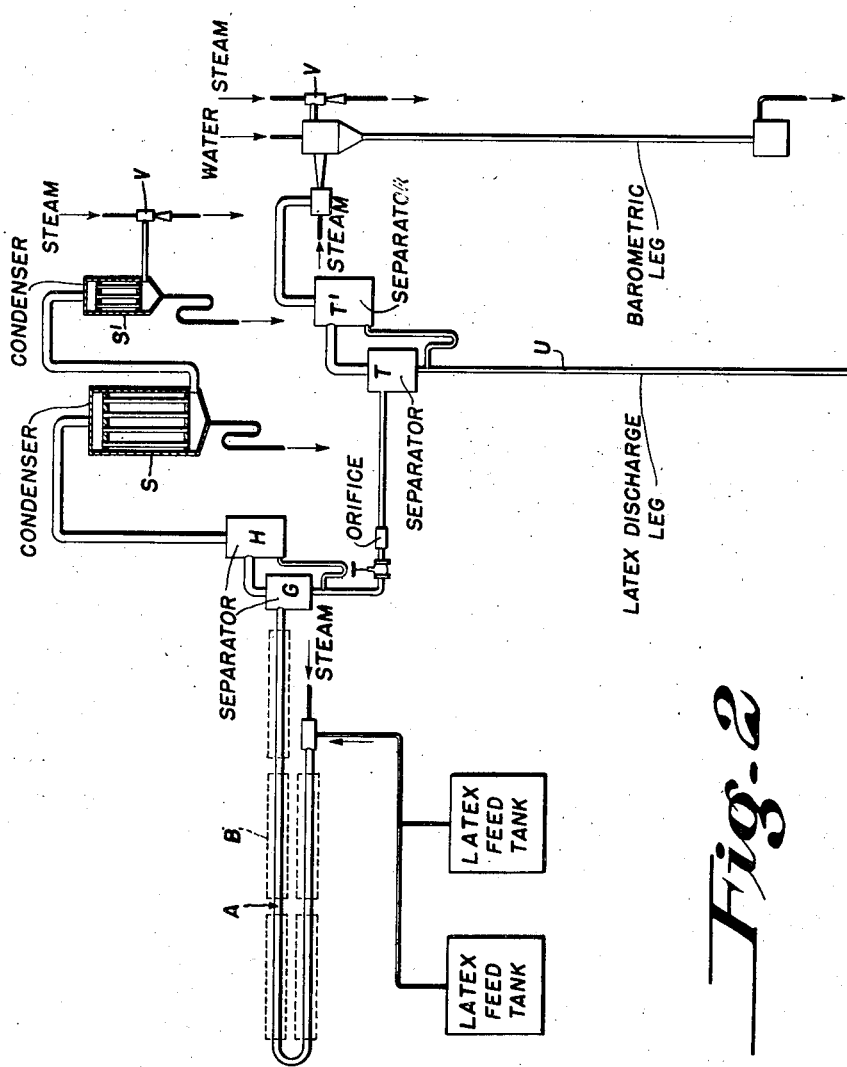

In the drawings, which form a part of the present specification, Figure 1 is a diagrammatic view of a system for carrying out the present invention, particularly adapted for the concentration of elastomer latices, while Figure 2 is a diagrammatic view of a somewhat modified system providing for the recovery of volatile constituents from, as well as concentration of, the latex.

In these drawings, in which like reference characters refer to like parts in the several views, A designates a series of glass tubes, A', A'' and A''', of increasing diameter which are surrounded by jackets B through which steam or other heating medium may be passed by means of suitable inlets and outlets for heating the glass tubes. The heating jackets B may be connected in series or each may be connected directly to a source of steam or other heating medium. Latex is fed from any suitable storage through a fluted rotameter C into the tube A' through a valve D, by which the flow may be regulated. Steam is injected into the tube A', preferably through some type of meter such as an orifice flow meter E, and through a regulating valve F. The latex and steam are introduced at a point where they are mixed together before they enter the heated portion of the tube. The latex inlet is several tube diameters in front of the jacketed portion of the tube to allow maximum turbulence without channeling through the heated portion of the tubes. The tubes A', A'' and A''' are capable of being heated at various temperatures, depending upon the particular pressure of steam used. From the tubes A, the vapors and latex pass into the separator G from which the vapors pass into a cyclone separator H to effect a further separation of entrained liquid from the vapors. The resulting vapors pass through a sight glass I to the condensers and vacuum pump of any desired type. The steam and latex coming from the tubes A is passed into the cylindrical container G in a radial manner so that it is exhausted on the wall of the separator, which prevents excess foam formation. The latex, which has been partially concentrated, passes from the bottom of the separators G and H through the flash tube J in which the orifice K serves as a Venturi opening across which the latex drops to a lower pressure, causing further concentration of the latex. The latex, which is now stripped of volatile constituents and concentrated, is cooled as it expands in the flash tube J and may be discharged into a vapor-liquid separator L from which it is drained into suitable receivers N through the pipe M. The vapors resulting from the flash distillation may be withdrawn through the vacuum system in any desired manner. The temperatures of the two stages of the process may be determined by thermometers inserted in the sight glasses I and O, while the pressures are shown by the manometers P, Q and R.

Where chloroprene or other volatile material is to be stripped from the latex, the vapors from the separator H are passed through a series of condensers S and S', as illustrated in Figure 2, in which the first condenser may be maintained at a temperature which will condense the water vapor to the exclusion of the monomer, and the second condenser is maintained at such lower temperature as is necessary to condense the monomer to be recovered.

As illustrated in Figure 2, the latex, as it is discharged from the flash tube, may be passed into a separator T from which further separation of liquid from the vapor phase can be effected in the separator T' in a manner similar to the separation effected in the first stage in G and H into which the vapor-latex mixture issues from the tubes A. The liquid product now stripped, concentrated and cooled to the desired state may be removed through a barometric leg U to suitable storage. Vacuum for the two stages of the system, as illustrated in Figure 2, may be obtained through steam eductors V. As illustrated in Figure 2, evaporator tubes A may be less in number than that shown in Figure 1, and may be heated by sectional jackets B.

In the concentration of neoprene latex, the apparatus as illustrated in the attached drawings may be operated as follows:

Neoprene latex of 50% solids content, as produced according to the process of Example 25 of U. S. Patent 2,264,173 and which contains about 2% of unpolymerized chloroprene, is passed into the tubes A at the rate of 202 pounds per hour together with steam at the rate of 48 pounds per hour. Atmospheric steam is employed in the jackets B to maintain the tubes A', A'' and A''' at 100° C. The boiler tubes A', A'' and A''' are of glass and are 25 mm. in diameter and 5 feet long for A', 31 mm. in diameter and 6 feet long for A'' and 34 mm. in diameter and 6½ feet long for A'''. The flash tube J is one inch in diameter. The first series of separators is maintained at 150 mm. Hg pressure, and the second stage is maintained at 20 mm. Hg pressure. The latex which collects in the receivers N will be found to be free of chloroprene monomer, cooled to approximately 20° C., and will have a solids content of 60%. Calculations indicate the superficial vapor velocity at the inlet to the tube A' to be 150 ft./sec., and the superficial vapor velocity at the point of discharge into the separator G to be 260 ft./sec. Calculated superficial discharge vapor velocity from the flash tube J is 350 ft./sec.

Similar concentration of other latices can be effected in this apparatus operating in the manner described above. For example, a 35% dispersion of an interpolymer of equal parts of 1,3-butadiene and styrene in a 4% alkaline sodium oleate solution can be concentrated to a 50% latex; and a 36% dispersion of an interpolymer containing 87% chloroprene and 13% acrylonitrile in an alkaline sodium oleate solution can also be concentrated to about 50% latex, and unpolymerized acrylic nitrile which remains can be recovered.

The process as described above takes advantage of the turbulent flow along the walls of the tube to give substantially uniform distribution of latex without channeling through the heated portions of the tube, thus providing a rapidly moving film which reduces the tendency of the latex to over-concentrate and coagulate. The turbulent high velocity flow also breaks any bubbles which are produced within the tube, thus preventing the build-up of foam and making the use of anti-foaming agents unnecessary.

The boiler tubes should not be heated on the return bends but only on the straight sections where the dispersion is uniformly distributed on the walls, for, as the dispersion passes around the bend, the greater proportion of it is thrown by centrifugal force upon the far side of the tube, resulting in only a thin film on the near side of the bend. Heating of this thin film of latex causes over-concentration, resulting in a permanent polymer build-up upon that section of the wall which not only reduces the overall efficiency of the operation, but tends to build up the coagulated polymer to such a thickness as to retard the flow of material past that point.

Since the discharge of the liquid and vapor at a high velocity on the surface of a shallow pool of the liquid tends to produce strong foaming of any liquid which has foaming tendencies and the foam thus created would carry with it large amounts of polymer which would tend to plug the vapor lines, it is desirable that the rapidly moving liquid, as it is exhausted from the concentrator tubes, should be allowed to impinge on smooth surfaces in the vapor liquid separators from which the liquid drains down and is removed from the bottom without any hold-up.

In the concentration of elastomer latices such as in the concentration of a 50% neoprene latex to one of 60% solids content, it is essential that, in the second stage of the evaporation which is brought about by flash concentration, no heat be introduced into the latex through the walls of the tubes. At approximately 58% solids content, the viscosity of the latex has increased to a point where its movement along the walls of the tube is retarded so that over-concentration and coagulation result. In the present process, the evaporation in the flashing operation, which concentrates the latex from 57% or 58% solids to 60% solids, takes place only from the heat content of the latex as its boiling point is reduced by the rapid reduction of pressure. In this operation, the latex is not only uniformly concentrated, but has the added benefit of being cooled for storage.

An important feature of the present invention is in the simultaneous injection of steam and the cold elastomer latex into the evaporating tube so that, before any external heat is applied, the liquid-vapor mixture is moving at a very high velocity. It is also essential that the initial vapor to liquid volume ratio be high, and that a certain high minimum vapor velocity be maintained throughout the heating zone so as to prevent coagulation of the latex on the walls of the tube. In the flow of the steam and latex through the evaporating tube, a latex film is established on the inner walls of the tube from which the volatile materials are removed by boiling as a result of the heat introduced from an external source through the walls of the tube. The steam is substantially saturated through the entire length of the tube. In addition to the evaporation of some of the volatile materials from the latex in the evaporating tube, a further evaporation is effected by passing the resulting latex through a flash evaporator. This also effects a cooling of the product so that it can be run directly from the separators into storage tanks without further cooling. By using the Venturi constriction or other constriction in a tube, the pressure drop occurs almost entirely at the point of constriction so that the flash distillation occurs at that point or as the latex is passed only a short distance from the constriction.

The dimensions, relative location and number of the evaporator tubes may be varied. For example, the length of the tubes is determined by the desired rate with which the liquid is to be concentrated and the amount of concentration desired. The diameters of the tubes must be such that the desired vapor velocity can be attained, but not so small that a great pressure drop between inlet and outlet of the tube occurs. Glass tubes of from 8 mm. to at least 4 inches in diameter (which are the largest heat exchange glass tubes now available) are applicable for use in this process. It is of course understood that even larger tubes, if available, may be employed where the conditions described are obtainable. It is desirable to operate at a minimum pressure drop because an increase in inlet pressure causes a higher boiling point for the liquid and thus reduces the amount of heat that can be transferred with a fixed outside temperature. The location of the return bends is immaterial. While the return bends introduce a certain additional pressure drop, it is convenient to have the evaporator tubes in a more compact unit. It is immaterial whether the tubes are so arranged that the liquid passes upward around the return bends or downward around the bends. Where the tubes are used in a vertical position, the flow of the steam and latex is preferably downward, although when using somewhat higher than the minimum velocities specified, the flow may be upward. A single tube or a battery of single tubes, all arranged for downward flow of the material, may be employed.

The relative locations of the steam and latex inlets into the boiler tube are immaterial as long as they are a sufficient distance from the heated portion of the tube to allow for complete mixing and distribution on the walls before boiling occurs.

Any suitable heating medium may be employed to heat the boiler tubes. Hot water as well as steam has been used, but steam is the most satisfactory as a better film coefficient of heat transfer is obtained.

The orifice regulating the flow of liquid from the higher pressure stage of the operation to the lower stage may be a fixed orifice calculated to handle the desired liquid feed, or it may be variable, as a valve or stopcock. If variable, it can be adjusted manually to handle the liquid so that none builds up in the separators but is drained as rapidly as it enters.

The removal of the condensate from the condensers and the concentrated product from the final liquid-vapor separator may be by means of either a barometric leg takeoff or a series of evacuated receivers which can be filled and drained independently, or any combination of the two methods.

The requirements for the two vacuum systems are very satisfactorily met by the use of steam eductors, but any other type of vacuum pump of sufficient capacity may be employed.

Materials of construction for the equipment may be of any suitable type, although the use of glass or glass-enamel for equipment coming in contact with dispersions of synthetic elastomers is preferred.

Operating conditions may be varied between certain limits. In the concentration of synthetic elastomer dispersions, vapor velocities of from 125 to 150 ft./sec. are satisfactory, when using an internal pressure of 150 mm. Hg, to prevent polymer coagulation and foaming. Higher velocities do not appreciably decrease the tendency toward over-concentration (and coagulation) until theoretical vapor velocities in excess of 600 ft./sec. are reached. Velocities as high as 600 ft./sec. are ordinarily not practical, due to the great pressure drop. Velocities somewhat below 125 ft./sec. may be used where some mechanical means for distributing the latex on the walls of the tubes is employed, such as fixed vanes designed to impart a helical flow to the liquid.

The amount of heat transferred from the external heating medium to the liquid being evaporated is a function of the film coefficients of heat transfer on each side of the tube, the wall thickness, heat transfer coefficient of the material itself, and the temperature differential between the heating medium and the liquid being evaporated. In the present evaporation process, heat transfer as high as six times that which has been realized for batch boiling of neoprene latex in glass flasks or glass enamelled kettles has been obtained under similar operating conditions with no indication that this value approaches the upper limit of heat transfer. Lower jacket temperatures produce lower values for heat transfer, with the only result being a slower rate of evaporation.

The pressure at which the evaporator system can be operated can be varied within wide limits. In the distillation of neoprene and similar latices, a desirable range of operation of temperature and pressures will be dictated by various factors. Too high a temperature is of course undesirable for those materials which are adversely affected by such high temperatures. As the concentrator temperature is dependent upon the pressures employed, the pressure should not be too high. With neoprene latex, an arbitrary limit of 90° C., which is equivalent to about 525 mm. Hg pressure, can be employed without harm to the latex. Condensation and recovery of monomeric chloroprene is readily accomplished without pumping or drying at 150 Hg pressure or above, which is equivalent to a temperature of 60° C. From an efficiency standpoint, it is desirable to operate at as low a pressure as possible to utilize the maximum possible temperature differential for a fixed jacket temperature. At high pressures more concentration can be obtained in the flashing operation, requiring less concentration during the boiling operation in the tubes. This results in greater operationable flexibility and a greater margin of safety from coagulation at the higher viscosities encountered with higher solids content latex. It is desirable to operate the flash evaporation at the lowest pressure possible but avoiding a temperature at which the concentrated product will freeze or thicken to such a point that it does not flow freely.

The process above described, in which neoprene latex has been employed, is applicable to the concentration of other elastomer latices such as butadiene-styrene interpolymer latices, chloroprene acrylonitrile latices, etc. It is particularly suitable for the recovery of chloroprene from polychloroprene latices produced by processes in which low yields of polychloroprene are produced in the polymerization step. The invention may also be used in the concentration of natural rubber latex.

We claim:

1. The process for the removal of volatile substances from elastomer latices which comprises simultaneously injecting steam and the latex into an externally heated elongated tube, the vapor-liquid ratio being such that the initial vapor velocity in the tube is at least 125 ft./sec., separating the vapor from the vapor-liquid mixture as it emerges from the tube and immediately passing the partially concentrated latex through a constriction into an unheated tube maintained at a pressure lower than the pressure employed during the heating step, the diameter of the tube into which the liquid is ejected through the constriction being such that the vapor velocity in the tube is in excess of 125 ft./sec., and immediately separating the resulting cooled latex from the evolved vapors.

2. The process for concentrating elastomer latices and for recovering unpolymerized monomers therefrom, which comprises simultaneously injecting steam and the latex into an externally heated elongated tube, the vapor-liquid ratio being such that the initial vapor velocity in the tube is at least 125 ft./sec., separating the vapor from the vapor-liquid mixture as it emerges from the tube, recovering unpolymerized monomer by selective condensation of the separated vapors, and immediately passing the partially concentrated latex through a constriction into an unheated tube maintained at a pressure lower than the pressure employed during the heating step, the diameter of the tube into which the liquid is ejected through the constriction being such that the vapor velocity in the tube is in excess of 125 ft./sec., and immediately separating the resulting cooled latex from the evolved vapors.

3. The process for the removal of volatile substances from a polychloroprene latex which comprises simultaneously injecting steam and the latex into an externally heated elongated tube, the vapor-liquid ratio being such that the initial vapor velocity in the tube is at least 125 ft./sec., separating the vapor from the vapor-liquid mixture as it emerges from the tube and immediately passing the partially concentrated latex through a constriction into an unheated tube maintained at a pressure lower than the pressure during the heating step, the diameter of the tube into which the liquid is ejected through the constriction being such that the vapor velocity in the tube is in excess of 125 ft./sec., and immediately separating the resulting cooled latex from the evolved vapors.

4. The process for concentrating a polychloroprene latex and for recovering uppolymerized chloroprene therefrom, which comprises simultaneously injecting steam and the latex into an externally heated elongated tube, the vapor-liquid ratio being such that the initial vapor velocity in the tube is at least 125 ft./sec., separating the vapor from the vapor-liquid mixture as it emerges from the tube, recovering unpolymerized chloroprene by selective condensation of the separated vapors, and immediately passing the partially concentrated latex through a constriction into an unheated tube maintained at a pressure lower than the pressure employed during the heating step, the diameter of the tube into which the liquid is ejected through the constriction being such that the vapor velocity in the tube is in excess of 125 ft./sec., and immediately separating the resulting cooled latex from the evolved vapors.

RAYMOND W. MORROW.
JAMES L. PARSONS.

REFERENCES CITED

The following references are of record in the file of this patent:

UNITED STATES PATENTS

| Number | Name | Date |
|---|---|---|
| 264,208 | Walker | Sept. 12, 1882 |
| 1,835,063 | Langmeier | Dec. 18, 1931 |
| 2,224,925 | Potts et al. | Dec. 17, 1940 |
| 2,362,052 | Craig | Nov. 7, 1944 |
| 2,379,268 | Zimmer | June 26, 1945 |
| 2,406,581 | Bergstrom et al. | Aug. 27, 1946 |
| 2,433,060 | Ohsohl et al. | Dec. 23, 1947 |

OTHER REFERENCES

Badger and McCabe, "Elements of Chemical Engineering," second edition, published 1936 by McGraw-Hill Book Co., Inc., New York, New York. (Copy in Library of Congress, pages 177–179.)